(12) United States Patent  (10) Patent No.: US 8,725,957 B2
Eleftheriou et al.  (45) Date of Patent: *May 13, 2014

(54) REDUCING ACCESS CONTENTION IN FLASH-BASED MEMORY SYSTEMS

(75) Inventors: Evangelos S. Eleftheriou, Rueschlikon (CH); Robert Haas, Rueschlikon (CH); Peter Mueller, Rueschlikon (CH); Roman A. Pletka, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,947

(22) Filed: Aug. 1, 2012

(65) Prior Publication Data

US 2012/0297128 A1  Nov. 22, 2012

Related U.S. Application Data

(63) Continuation of application No. 12/637,897, filed on Dec. 15, 2009, now Pat. No. 8,285,946.

(51) Int. Cl.
    *G06F 9/52*  (2006.01)
(52) U.S. Cl.
    USPC ........................................................ 711/150
(58) Field of Classification Search
    None
    See application file for complete search history.

(56) References Cited

U.S. PATENT DOCUMENTS

| 6,069,827 | A * | 5/2000 | Sinclair ..................... 365/185.29 |
| 6,985,992 | B1 | 1/2006 | Chang et al. |
| 7,409,490 | B2 | 8/2008 | Liu |
| 7,552,272 | B2 | 6/2009 | Gonzalez et al. |
| 2005/0144516 | A1 | 6/2005 | Gonzalez et al. |
| 2008/0219053 | A1 | 9/2008 | Kim |
| 2008/0250270 | A1 * | 10/2008 | Bennett .............................. 714/6 |
| 2008/0320214 | A1 | 12/2008 | Ma et al. |
| 2009/0089485 | A1 | 4/2009 | Yeh |
| 2009/0172258 | A1 | 7/2009 | Olbrich et al. |
| 2009/0204872 | A1 | 8/2009 | Yu et al. |
| 2010/0262773 | A1 * | 10/2010 | Borchers et al. .............. 711/114 |

OTHER PUBLICATIONS

On Efficient Wear Leveling for Large-Scale Flash-Memory Storage Systems, [online]; [retrived on Dec. 7, 2009]; retrieved from the Internet http://www.cis.nctu.edu.tw/~lpchang/papers/crm_sac07.pdf.

DFTL: A Flash Translation Layer Employing Demand-based Selective Caching of Page-level Address Mappings, [online]; [retrieved on Dec. 7, 2009]; retrieved from the Internet http://csl.cse.psu.edu/publications/dftl-asplos09.pdf.

(Continued)

*Primary Examiner* — Duc Doan
(74) *Attorney, Agent, or Firm* — Cantor Colburn LLP; Daniel Morris (57) ABSTRACT

Exemplary embodiments include a method for reducing access contention in a flash-based memory system, the method including selecting a chip stripe in a free state, from a memory device having a plurality of channels and a plurality of memory blocks, wherein the chip stripe includes a plurality of pages, setting the ship stripe to a write state, setting a write queue head in each of the plurality of channels, for each of the plurality of channels in the flash stripe, setting a write queue head to a first free page in a chip belonging to the channel from the chip stripe, allocating write requests according to a write allocation scheduler among the channels, generating a page write and in response to the page write, incrementing the write queue head, and setting the chip stripe into an on-line state when it is full.

17 Claims, 6 Drawing Sheets

(56) References Cited

OTHER PUBLICATIONS

Write Amplification Analysis in Flash-Based Solid State Drives, [online]; [retrieved on Dec. 7, 2009]; retrieved from the Internet http://www.haifa.ibm.com/conferences/systor2009/papers/2_2_2.pdf.

Improving NAND Flash Based Caches, [online]; [retrieved on Dec. 9, 2009]; retrieved from the Internet http://www.ewp.rpi.edu/hartford/~markst2/SMRE/Project/Articles/3174a327.pdf.

LAST: Locality-Aware Sector Translation for NAND Flash Memory-Based Storage Systems, [online]; retrieved on Dec. 7, 2009]; retrieved from the Internet http://nyx.skku.ac.kr/papers/OSR.pdf.

International Search Report for International Application No. PCT/IB2010/055802 mailed Apr. 20, 2011.

Written Opinion of the International Searching Authority for International Application No. PCT/IB2010/055802 mailed Apr. 20, 2011.

The Design and Implementation of a Log-Structured File System, [online]; [retrieved on Dec. 11, 2009]; retrieved from the Internet http://www.eecs.berkeley.edu/~brewer/cs262/LFS.pdf.

* cited by examiner

REDUCING ACCESS CONTENTION IN FLASH-BASED MEMORY SYSTEMS

CROSS-REFERENCE TO RELATED APPLICATION

This application is a continuation of U.S. patent application Ser. No. 12/637,897, filed Dec. 15, 2009, the disclosure of which is incorporated by reference herein in its entirety.

BACKGROUND

The present invention relates to flash-based memory systems, and more specifically, to methods and systems for reducing access contention in flash-based memory systems, or other memory systems exposing similar properties as flash-based memory systems.

Flash memory is a non-volatile computer storage that can be electrically erased and reprogrammed. Flash-based storage devices such as solid-state drives (SSD) have hardware characteristics in which reads and writes are typically performed in page-sized chunks, typically 2 to 4 KB in size. Erases are typically performed in full blocks where a block typically includes of 64 to 128 pages. Flash memory includes both NOR types and NAND types. Generally, there exist two different types of NAND flash chips: the type based on single-level cells (SLC) store one bit and the type based on multi-level cells maintain multiple voltage levels in order to store more than one bit. A 4 KB page in an SLC-based flash chip has typical read and write times of 25 and 600 µs, respectively. Erasing a full block takes significant longer amount of time and can take 7 ms in enterprise-grade flash chips. These read/write/erase characteristics are valid irrespective of the workload. In contrast, in hard disk drive (HDD)-based storage systems, the seek time limits the random access performance. However, in flash-based storage devices cells must first be erased before they can be programmed (e.g., written). Therefore, the common technique used to hide the block erase latency is to always write data out-of-place and erasing of blocks is deferred until garbage collection is initiated. When an erase command is issued, the chip is busy until the operation completes and there is no way to read or write on this chip during this time, which is referred to as "blocking erase". The out-of place write strategy requires a special layer called the Flash Translation Layer (FTL), which maintains the mapping between logical block addresses (LBA) and the actual physical page/block addresses (PBA) in the Flash memory.

Figure 1:
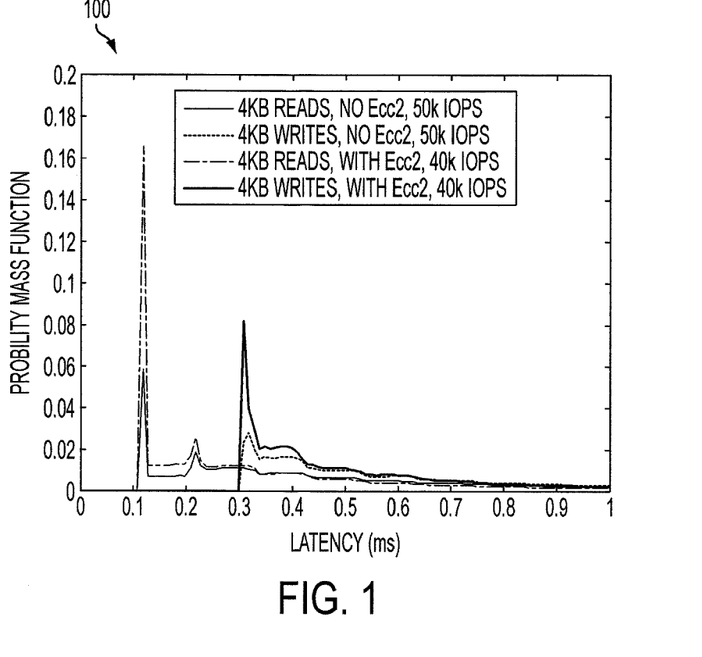
FIG. 1 illustrates a plot of probability density function versus latency for a simulated prior art system.
Figure 2:
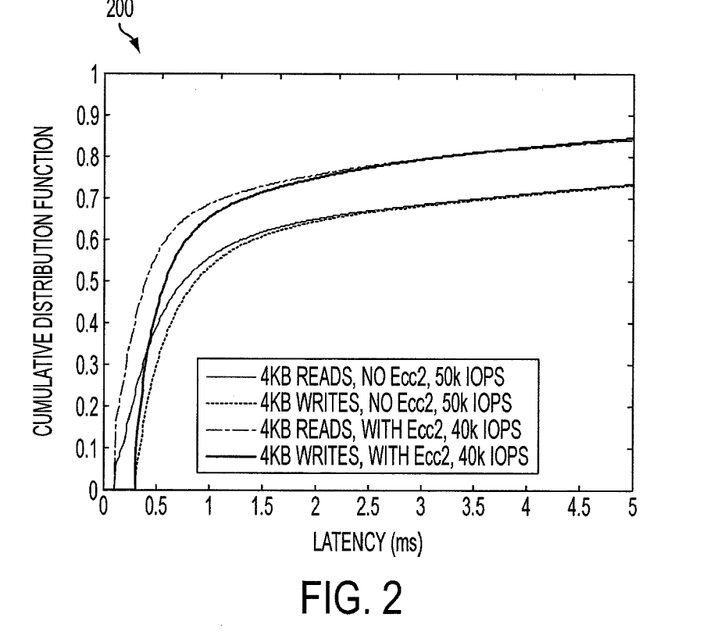
FIG. 2 illustrates a plot cumulative distribution function versus latency for a simulated prior art system.

Access time to the flash-based storage device can still expose delay variations. FIG. 1 illustrates a plot 100 of probability density function versus latency for a simulated prior art system. FIG. 2 illustrates a plot 200 of cumulative distribution function versus latency for a simulated prior art system. FIGS. 1 and 2 illustrate a flash simulator in a high load scenario. In the example, when a block is being erased, a subsequent read request on the same chip might have to wait up to 7 ms to be serviced. Similarly, a read request can be delayed up to 600 us by an ongoing write request. Such significant delays are in certain environments not acceptable. In addition, certain countries (e.g., Japan) even force maximum delay bounds (~5-10 ms) for specific IT applications. Hence the potential total delays may exceed the required delay bounds. Moreover, traditional DRAM memory technologies don't have the same restrictions as flash and hence provide significant more homogeneous access delays. Flash cache solutions try to replace expensive battery-backed DRAM memory, called NVRAM, with Flash. Hence, the characteristics of such a flash cache are similar to the ones of those memory technologies. It is therefore beneficial but not trivial to provide such characteristics with Flash-based memory technologies.

SUMMARY

Exemplary embodiments include a method for reducing access contention in a flash-based memory system or a memory systems exposing similar properties as flash-based memory systems, the method including selecting a chip stripe in a free state, from a memory device having a plurality of channels and a plurality of memory blocks, wherein the chip stripe includes a plurality of pages, setting the chip stripe to a write state, setting a write queue head in each of the plurality of channels, for each of the plurality of channels in the flash stripe, setting a write queue head to a first free page in a chip belonging to the channel from the chip stripe, allocating write requests according to a write allocation scheduler among the channels, generating a page write and in response to the page write, and incrementing the write queue head.

Additional exemplary embodiments include a computer program product for reducing access contention in a flash-based memory system, the computer program product including instructions for causing a computer to implement a method, the method including selecting a chip stripe in a free state, from a memory device having a plurality of channels and a plurality of memory blocks, wherein the chip stripe includes a plurality of blocks, and blocks include a plurality of pages, setting the ship stripe to a write state, setting a write queue head in each of the plurality of channels, for each of the plurality of channels in the flash stripe, setting a write queue head to a first free page in a chip belonging to the channel from the chip stripe, allocating write requests according to a write allocation scheduler among the channels, generating a page write and in response to the page write, and incrementing the write queue head.

Further exemplary embodiments include a memory device, including a plurality of channels having a write allocation scheduler, at least one chip stripe communicatively coupled to each of the plurality of channels, the at least one chip stripe has a free state, a write state, an online state, and an erase state, wherein the at least one chip stripe is configured to be set from the free state to the write state to allocate write requests, and is further configured to be set from the write state to the online state to serve read requests.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein reduce/eliminate access contention caused by erase and write delays of flash-based memory systems. The exemplary embodiments described herein discuss flash-based memory systems as an illustrative example. It is understood that in other exemplary embodiments, the methods described herein can be applied to any memory system that exposes similar properties in terms of access times and blocking write or erase operations than flash-based memory systems. In exemplary embodiments, flash-based storage device architecture is capable of delivering stringent delay bounds for read and write requests. In addition, the architecture provides efficient garbage collection and wear-leveling, especially for flash cache solutions. In exemplary embodiments, the systems and methods described herein completely hide additional delays from preceding operations on the same chip by decoupling read, write, and erase operations. To protect read and writes on a chip from additional delays caused by a preceding erase operation on the same chip, read and write operations are only done on chips where no erases are taking place while still providing access to all information stored, (i.e., the full LBA space of the device). Similarly, methods described herein can be implemented to protect read operations from being penalized by erase and write delays of preceding requests on the same chip. In exemplary embodiments, read operations are protected from penalization implementing an architecture, where flash chips are attached to channel busses and grouped into chip stripes among channels. This architecture is combined with a write strategy based on a per channel free-block queue with a write page allocator and a garbage-collection algorithm.

Figure 3:
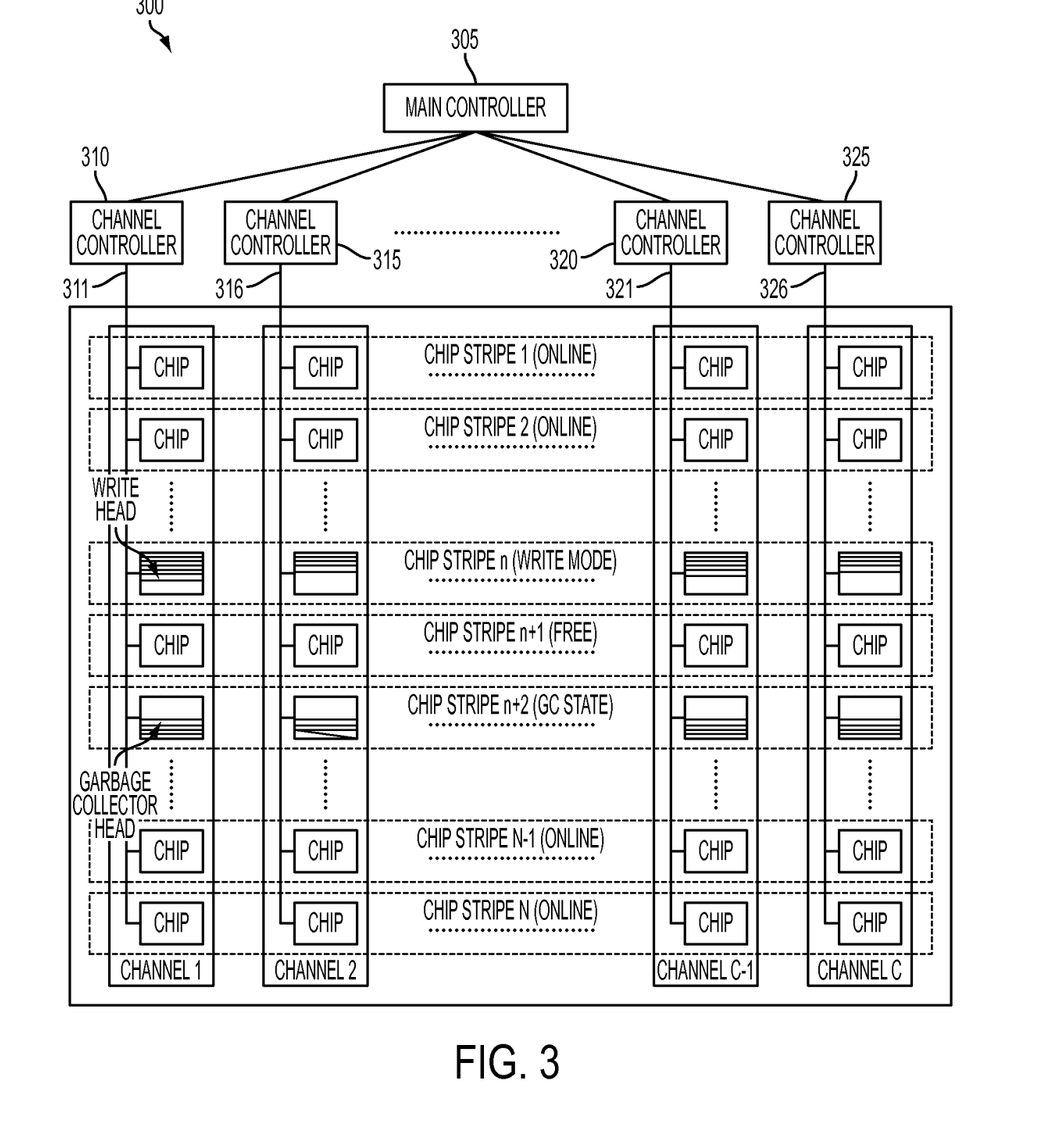
FIG. 3 illustrates an exemplary flash architecture in which exemplary access contention reduction methods can be implemented.

A flash-based storage device such as a Flash Cache or an SSD includes a number of channels to which Flash chips are attached. Each channel has a low-complexity channel controller that manages all requests to the chips. The channels are controlled by a dedicated channel controller that performs read, write, and erase operations on chips and potentially other operations such as adding or verifying error correction information. The channel controllers are controlled by the main controller that performs the main tasks such as LBA-to-PBA mapping, garbage collection, free and bad-block management. FIG. 3 illustrates an exemplary flash architecture 300 in which exemplary access contention reduction methods can be implemented. As described herein, the architecture 300 includes a main controller 305 for multiple lower complexity channel controllers 310, 315, 320, 325. In exemplary embodiments, the main controller 305 maintains one free-block queue and a write queue head for each channel. The free-block queue holds all blocks that can be used for writing. The write queue head points to the first free page in the block where data is currently being written. The free-block has been previously taken from the free-block queue of the channel, as further described herein. In exemplary embodiments, each channel controller 310, 315, 320, 325 includes a respective channel of chips. As illustrated, by way of example, controller 310 controls channel 1, controller 315 controls channel 2, controller 320 controls channel C−1, and controller 325 controls channel C. In addition, each channel controller 310, 315, 320, 325 is communicatively coupled to its respective channel by a channel bus 311, 316, 321, 326. Each channel also includes chips, which are generally shown as "Chip". In exemplary embodiments, the write mode stripes (e.g., Chip Stripe n) can include write head chips. In addition, the GC stripes (e.g., Chip Stripe n+2) can include garbage collector head chips.

Figure 4:
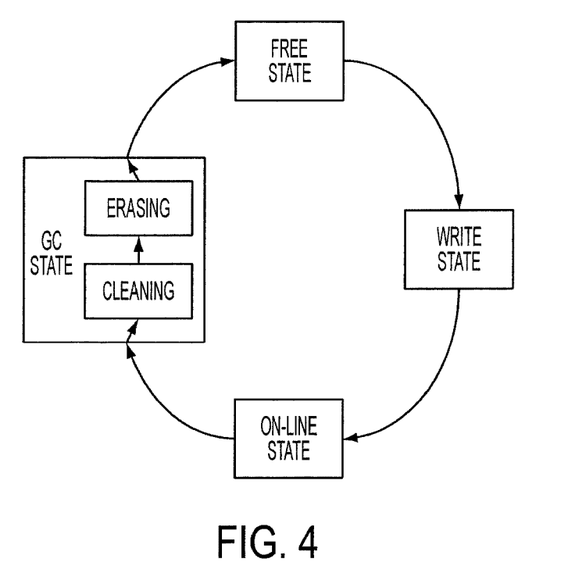
FIG. 4 illustrates an exemplary state diagram showing the exemplary four states and respective transitions as described herein.

Besides the channel structure, chips are virtually grouped into so called chip stripes, shown as Chip Stripe 1, Chip Stripe 2, Chip Stripe n, Chip Stripe n+1, Chip Stripe n+2, Chip Stripe N−1, Chip Stripe N. As such, the first chip in each channel belongs to the first chip stripe and the like. In exemplary embodiments, a chip stripe is in one of four states: online, garbage collection (GC), free, or write state. FIG. 4 illustrates an exemplary state diagram 400 showing the exemplary four states and respective transitions as described herein. In the example shown in FIG. 3, Chip Stripe 1, Chip Stripe 2, Chip Stripe N−1 and Chip Stripe N are "Online", implemented for read requests, Chip Stripe n is a write mode stripe, Chip Stripe n+1 is free, and Chip Stripe n+2 is in a GC state. These states are illustrative, and other states are contemplated in other exemplary embodiments.

In exemplary embodiments, when a chip stripe is in online state, data can be read from all its chips. A chip stripe in free state holds chips with all blocks freshly erased and ready to be written. A chip stripe in write state consists of chips on which data is currently being written. In a preferred embodiment there is only one chip stripe in write state at any time. However, in certain circumstances it can make sense to have more than one chip stripe in write state as described further herein.

In exemplary embodiments, chip stripe in garbage-collection state (GC state) includes chips currently being cleaned up in order to prepare them for writing. Preferably there is no more than one chip stripe in GC state. As such, GC can occur in a single chip in each channel at any time. In addition, there can be more than one chip stripe in GC state, which is desirable if GC is accelerated. The number of chip stripes in GC state can also be dynamic (i.e., adaptive to the workload). A significant amount of storage space is reserved in the GC state and hence can not be used to store actual data during GC. In exemplary embodiments, the GC state can have sub-states, such as a "cleaning" and an "erasing" state. The cleaning state denotes the state where yet valid pages are moved to new locations in the write stripe and the erasing state denotes the state where blocks are actually being erased after all valid pages have been moved to new locations. In the cleaning state, a user read request can still be served from the chip stripe. Once the chip stripe changed to the erasing state, all data on that chip stripe has been moved out and must be served from the new location. It is desirable to prevent serving user read requests from a stripe in erase state. As such, read request can be served from a new location. In exemplary embodiments, erasing can be interrupted on a single chip but continue on the entire stripe.

Figure 5:
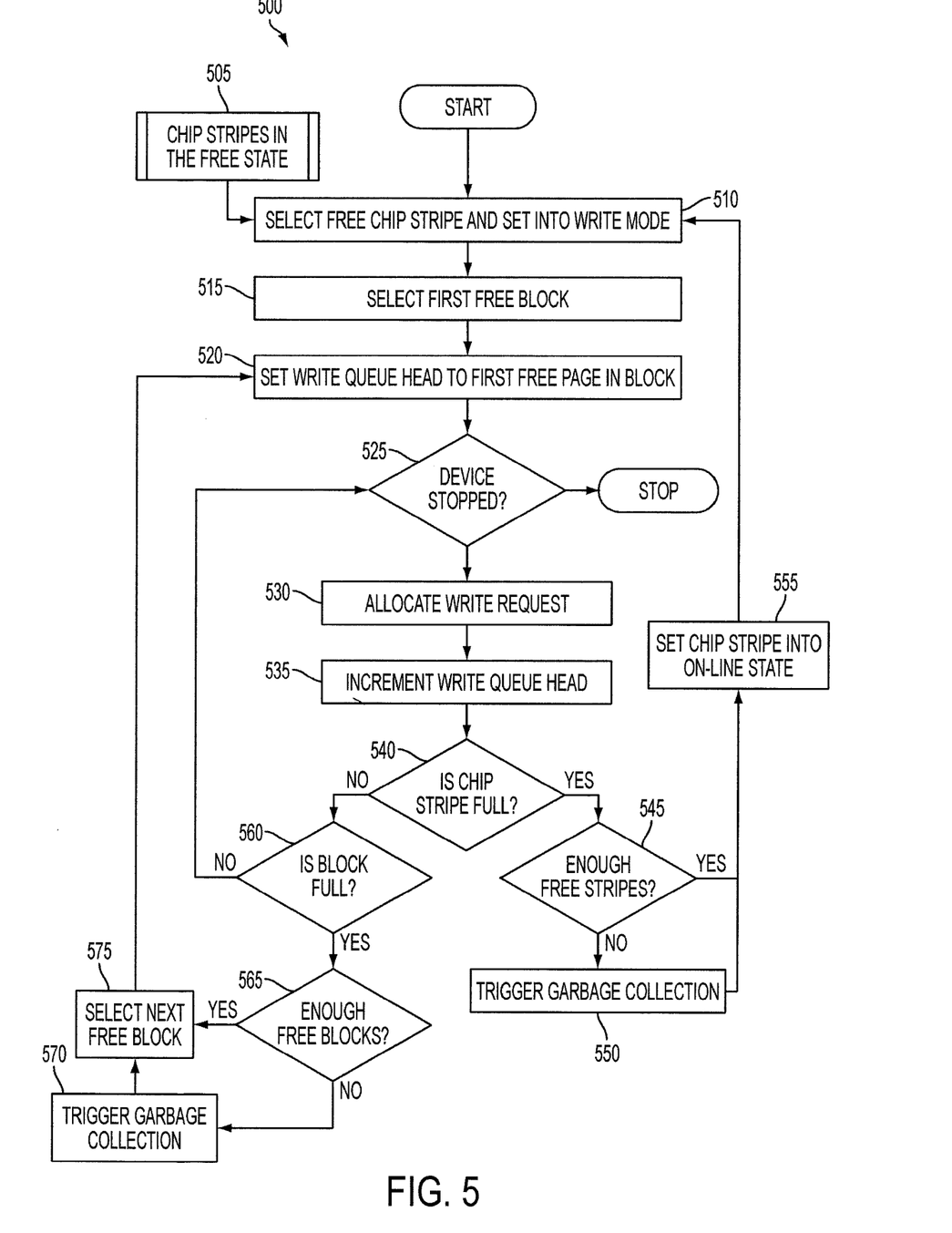
FIG. 5 illustrates a flow chart of a method for reducing access contention in flash-based memory systems in accordance with exemplary embodiments.

FIG. 5 illustrates a flow chart of a method 500 for reducing access contention in flash-based memory systems in accordance with exemplary embodiments. In exemplary embodiments, when the method 500 commences all blocks are free and hence all chip stripes are in the free state at block 505. At block 510, before data can be written to the device, a free chip stripe is selected and set into write mode. For example, the first free chip stripe on the flash chip can be selected, but any other free chip stripe can be selected at block 510. At block 515, for each channel, a free block is chosen from the corresponding free block queue. In exemplary embodiments, the first free block in the given chip stripe of each channel is chosen but any other free block in the given chip stripe and channel could be chosen as well. At block 520, for each channel, the write queue head is set to the first free page in the chip belonging to that channel from the chip stripe in write mode. At block 525, the method 500 checks whether the device has been stopped. If so, the method 500 terminates. If the device is still running, at block 530, a write request is then allocated according to the write allocation scheduler among the channels. In exemplary embodiments, a round-robin scheduler can be implemented, which distributes the write workload evenly among all available channels. Depending on the desired properties, other schedulers can be envisaged in other exemplary embodiments. At block 535, once a page has been written, the write queue head is incremented in order to set it to the next free page in the block. At block 540, the method 500 checks if a chip stripe is full or not. In case the chip stripe is full, block 545 determines if there are enough free stripes available according to a preconfigured value. If there are enough remaining chip stripes at block 545, then the method continues as block 555. If there are not enough remaining chip stripes at block 545, then garbage collection method 600 (See FIG. 6 herein) is triggered at block 550 in order to reclaim space from invalidated pages in blocks that have been written previously and method 500 continues at block 555. Note that in a preferred embodiment, garbage collection method 600 runs independently and in parallel to method 500. At block 555, it is known that the current stripe is full and it is set into on-line state. Method 500 then selects the next higher chip stripe that is free in block 510. In other exemplary embodiments, the selection of the next write chip stripe can be performed according to some policy. In case the chip stripe is not yet full, block 560 checks if the current block is full or not. In case the block is not yet full, the method 500 continues at block 525. When a block is full, at block 565, garbage collection is triggered in case there are not enough free blocks according to a predefined value in block 570 and the next free block is taken from the free block queue associated to this channel at block 575. In exemplary embodiments, the free-block queue can be maintained by keeping the blocks in the free block queue in the same order as their address in the chip (while removing all bad blocks).

In exemplary embodiments, GC can be triggered when the last free chip stripe is changed to write state or earlier based on a configurable threshold (i.e., based on the total number of free blocks), the number of free chip stripes that should be available in the system. In exemplary embodiments, the larger the threshold, the higher is the reserved memory space that is put aside and hence decreases the overall capacity available for reading and writing. The threshold can be set larger than zero to better accommodate write bursts. Similarly GC can be stopped when enough free pages are available. In exemplary embodiments, the method 500 can be re-initiated as needed.

Figure 6:
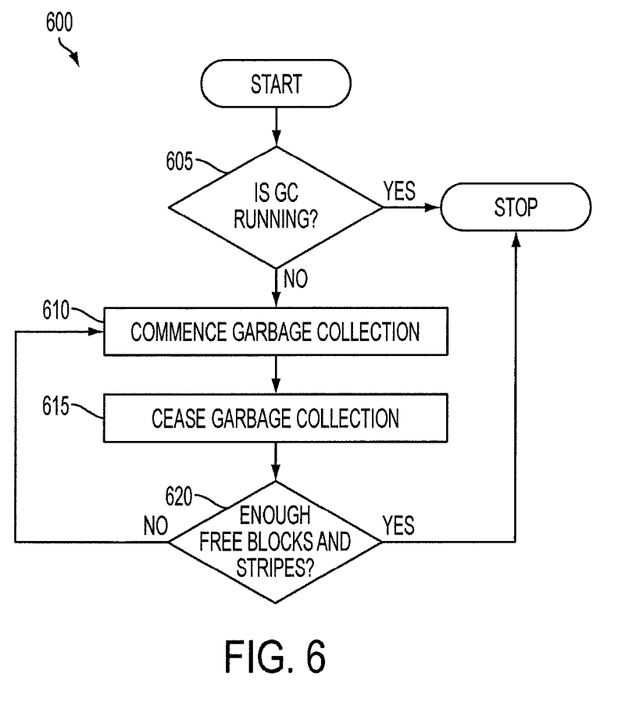
FIG. 6 illustrates a flow chart for an exemplary garbage collection method.

FIG. 6 illustrates a flow chart for an exemplary garbage collection method 600. Method 600 is triggered by method 500 in blocks 550 and 570 (see FIG. 5 above). It first checks, whether GC is already running or not. In case GC is already running, the already running GC method 600 frees enough space and there is no need to start another instance of the method 600. In case the GC is not running, garbage collection is commenced at block 610 and ceased at block 615. The detailed GC method is described in method 700 (see FIG. 7 herein). At block 620, after the termination of method 700, method 600 checks if enough free blocks and chip stripes are available or not. The method 600 triggers another GC round if this is not the case, method 600 ceases.

Figure 7:
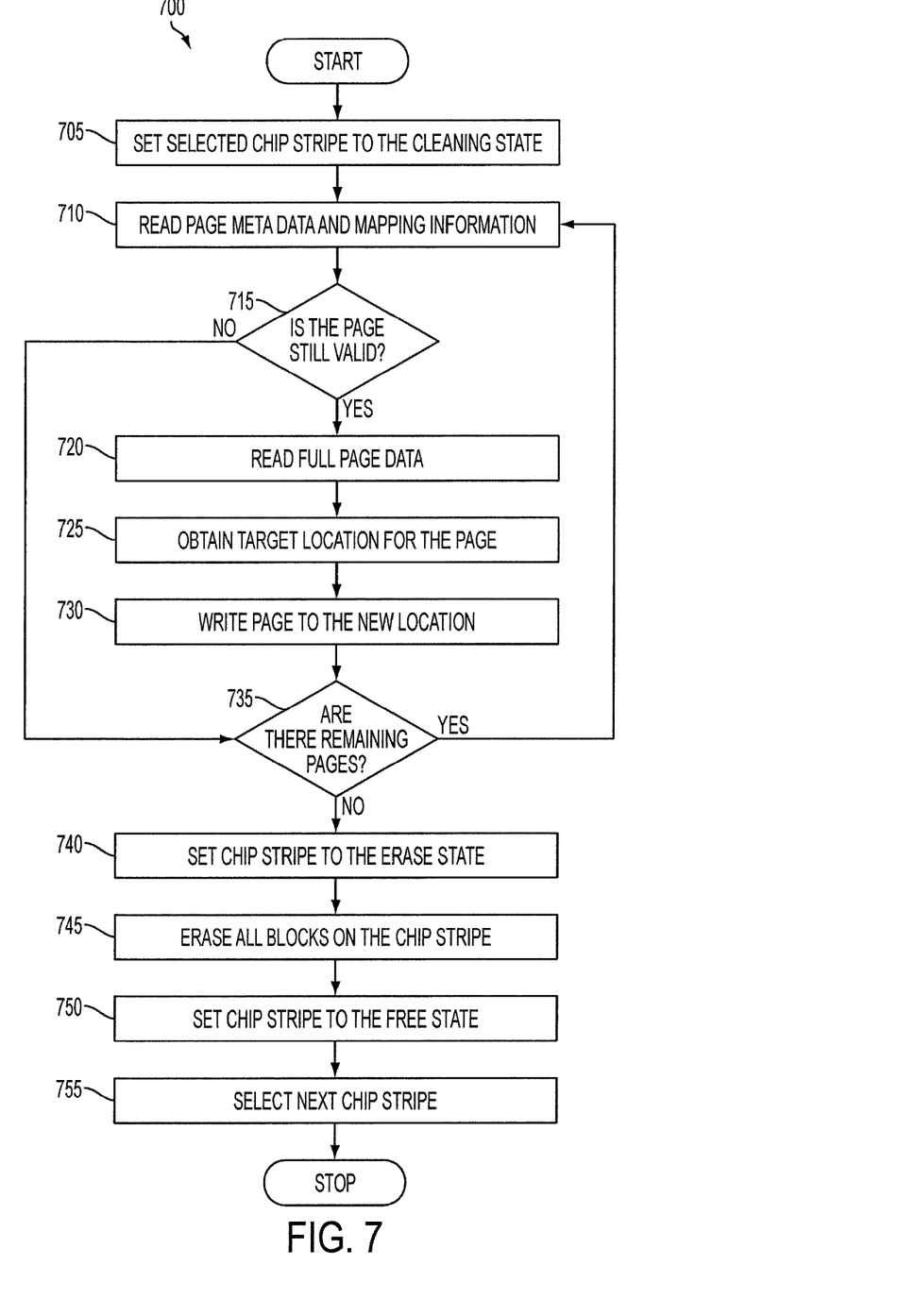
FIG. 7 illustrates a flow chart for an exemplary garbage collection method illustrating further detail from FIG. 6.

FIG. 7 illustrates a flow chart for an exemplary garbage collection method 700 in detail. In exemplary embodiments, the GC method 700 chooses the oldest chip stripe when it initiates. At block 705, the method 700 sets the selected chip stripe to the cleaning state. The method 700 then performs a series of blocks for all the pages in the selected chip stripe. At block 710, the method 700 reads the page meta-data and LBA-to-PBA mapping information. At block 715, the method 700 determines if the page is still valid. If the page meta-data and the LBA-to-PBA mapping information indicate that the page is still valid, then the page is written to a new place. As such, if the page is still valid at block 715, then at block 720, the method 700 reads the full page data. At block 725, the method 700 obtains a target location for the page from the write allocation scheduler. In exemplary embodiments, the write allocation scheduler can allocate the new location in the same channel or in another one. Furthermore, if the channel controller is capable of moving data directly in a channel, then the channel controller is preferred to move the data as it doesn't consume resources from other busses. At block 730, the method 700 writes the page to the new location. If at block 715, the page is no longer valid, no action is taken and the space that the invalid page occupies is automatically reclaimed later in the method 700 because the invalid page is not moved and thus is later erased. At block 735, the method determines if there are remaining pages. If at block 735, there are remaining pages, then the method 700 continues at block 710. If there are no remaining pages at block 735, then at block 740, the method 700 sets the chip stripe to the erase state. At block 745, the method 700 erases all blocks in the chip stripe. In exemplary embodiments, the channel controllers can perform erase operation of the blocks in parallel. In addition, each channel controller can perform block erases on a chip in the background, such that the respective channel is not blocked while blocks are being erased. At block 750, the method 700 changes the state of the chip stripe to the free state. At block 755, the method 700 determines on which chip stripe GC will run next time.

In exemplary embodiments, chip stripes can be split into sub-stripes depending on the number of chips on a given channel. In addition, the stripe size (i.e., the number of chips in the same channel that belong to the same chip stripe) is selected to effect channel bandwidth. Bandwidth management is particularly desirable when the channel controller supports pipelining of read and write operations on multiple chips. Hence more than one chip on the same channel might be associated to the same write stripe. Moreover, different stripe sizes can be supported for each chip stripe state.

In exemplary embodiments, user read requests can be protected from delays caused by ongoing erase and write operations on the same chip. User data being written in the write chip stripe is kept in the main controller's write cache until the full chip stripe has been written. User read requests for this freshly written data are then served from the write cache and hence potential delays due to preceding writes are eliminated. However, the main controller can require a huge write cache that is capable of holding a full chip stripe in order to perform these operations. In exemplary embodiments, in order to circumvent a huge write cache, two alternating write stripes can be implemented. When the write cache is de-staged to flash, the data is first written to the first write stripe, and then this write stripe is temporarily switched to the on-line state from where it can be accessed. The updates in the LBA-to-PBA map are maintained in a dedicated mapping block. The same data is then written to the second write stripe and a second LBA-to-PBA mapping block containing the changes is created. After completion of the write, the second write stripe is switched to the on-line state (the corresponding LBA-to-PBA mapping block is set active). The first chip stripe is switched back to write state and data can be de-staged from the write cache and so on. Once the write chip stripes are full, one of them is kept in on-line state, as well as the corresponding LBA-to-PBA mapping table. The other chip stripe can be erased and set to the free state or used for redundancy or parallel reads (same arguments as RAID 1). This type of operation doubles the total number of flash writes.

In some configurations there might be only a few chips on a single channel. Maintaining a full chip stripe for GC then becomes expensive in terms of reserved storage capacity that can not be used to hold user data. In such a configuration it is beneficial to group multiple channels into channel groups and splitting the chip stripes into sub-stripes. Hence one sub-stripe only includes chips from a single channel group. Then the same algorithm described herein can be applied on a sub-stripe instead of a full chip stripe. This approach reduces the erase speed as fewer chips can be erased in parallel. However, if the write workload is not high this approach can be implemented. As such, the sub stripe sizes can be dynamically adjusted depending on the observed write workload.

In exemplary embodiments, a channel as described herein can be either a physical or virtual channel. Several physical channels can be grouped into one virtual channel. Hence the systems and methods described herein apply to both, physical and virtual channels.

In exemplary embodiments, the GC, free, on-line, and write states move sequentially through all chip stripes, which can be referred to as a circular buffer. A circular buffer architecture has the advantage to equally distribute the wear of blocks on chip granularity, hence reducing the complexity of the scheme by not requiring additional wear-leveling methods. In the examples described herein, a round-robin strategy for allocating pages to be written is a solution that can be implemented in a circular buffer. Nevertheless, due to bad blocks the write queue head may become out of sync between the different channels. In such a case, extra rounds can be inserted in the round-robin scheduler where only pages are allocated in queues that are behind the head of the foremost write queue head.

In exemplary embodiments, in case workloads that can be separated into static and dynamic data, a circular buffer architecture may cause data to be unnecessarily moved around during GC. As such, another example of a policy that can be implemented is a window-based greedy reclaiming policy. The methods described herein can be adapted to fit into such a window-based greedy reclaiming policy by dynamically grouping chips into chip stripes as well as dynamically adapting the chip stripe size according to the information maintained by GC.

Technical effects include completely hiding additional delays from preceding operations on the same chip by decoupling read, write, and erase operations. Furthermore, read and write operations are protected on a chip from additional delays caused by a preceding erase operation on the same chip. Technical effects further include ensuring that read and write operations are only done on chips where no erases are taking place while still providing access to all information stored. In addition, read operations are protected from being penalized by erase and write delays of preceding requests on the same chip.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for reducing access contention in a memory chip having a channel and memory blocks, the method comprising:
    setting a write state and a write queue head within the channel, the channel including chip stripes;
    setting the write queue head to a first free page in the channel;
    allocating write requests according to a write allocation scheduler for the channel;
    generating a page write;
    in response to the page write, incrementing the write queue head; and
    setting an on-line state in the channel,
    wherein the memory chip is not in an erase state during the write state of one or more of the chip stripes.

2. The method as claimed in claim 1 further comprising triggering garbage collection.

3. The method as claimed in claim 2 wherein garbage collection is triggered in response to a change to the write state in the channel.

4. The method as claimed in claim 2 wherein garbage collection is triggered in response to reaching a predetermined threshold in the channel.

5. The method as claimed in claim 2 wherein garbage collection is triggered in response to a memory block becoming full.

6. The method as claimed in claim 2 wherein garbage collection comprises:
  setting a cleaning state in the channel;
  reading page meta-data and LBA-to-PBA mapping information;
  in response to a page being valid:
  reading full page data;
  obtaining a target location for the page;
  writing page data to new location;
  setting an erase state in the channel
  erasing all blocks within the channel; and
  setting a free state in the channel.

7. A computer program product for reducing access contention in a memory chip having a channel and a memory blocks, the computer program product including instructions for causing a computer to implement a method, the method comprising:
  setting a write state and a write queue head within the channel, the channel including chip stripes;
  setting the write queue head to a first free page in the channel;
  allocating write requests according to a write allocation scheduler for the channel
  generating a page write;
  in response to the page write, incrementing the write queue head; and
  setting an on-line state in the channel,
  wherein the memory chip is not in an erase state during the write state of one or more of the chip stripes.

8. The computer program product as claimed in claim 7 wherein the method further comprises triggering garbage collection.

9. The computer program product as claimed in claim 8 wherein garbage collection is triggered in response to a last free chip stripe changed to the write state in the channel.

10. The computer program product as claimed in claim 8 wherein garbage collection is triggered in response to reaching a predetermined threshold in the channel.

11. The computer program product as claimed in claim 8 wherein garbage collection is triggered in response to a memory block becoming full.

12. The computer program product as claimed in claim 8 wherein garbage collection comprises:
  setting a cleaning state in the channel;
  reading page meta-data and LBA-to-PBA mapping information;
  in response to a page being valid:
  reading full page data;
  obtaining a target location for the page;
  writing page data to new location;
  setting an erase state in the channel
  erasing all blocks within the channel; and
  setting a free state in the channel.

13. A memory system, comprising:
  a channel having a write allocation scheduler, the channel supporting a free state, a write state, an online state and an erase state, the channel including chip stripes;
  wherein the channel is configured to support changing set the free state to the write state to allocate write requests, and is further configured to support changing the write state to the on-line state,
  wherein the memory system is not in an erase state during the write state of one or more of the chip stripes.

14. The memory system as claimed in claim 13 further comprising a write queue head disposed in the channel,
  wherein the system is configured for:
  setting the write queue head to a first free page in a chip belonging to the channel;
  allocating write requests according to the write allocation scheduler;
  generating a page write; and
  in response to the page write, incrementing the write queue head; and
  setting an on-line state in the channel.

15. The memory system as claimed in claim 14 wherein the system is further configured for triggering garbage collection is in response to a change to the write state in the channel.

16. The memory system as claimed in claim 15 wherein garbage collection is triggered when a memory block is full and a predetermined threshold of free blocks on the memory system is reached.

17. The memory system as claimed in claim 15 wherein garbage collection comprises:
  setting a cleaning state in the channel;
  reading page meta-data and LBA-to-PBA mapping information;
  in response to a page being valid:
  reading full page data;
  obtaining a target location for the page;
  writing page data to new location;
  setting an erase state in the channel
  erasing all blocks within the channel; and
  setting a free state in the channel.

* * * * *